Jan. 22, 1924.

A. F. TOFFEY 1,481,570

PULL-OUT DEVICE FOR TIRE CHAINS

Filed Nov. 4, 1922

INVENTOR.
Alice F. Toffey
BY Jas. H. Griffin
ATTORNEYS.

Patented Jan. 22, 1924.

1,481,570

UNITED STATES PATENT OFFICE.

ALICE F. TOFFEY, OF JERSEY CITY, NEW JERSEY.

PULL-OUT DEVICE FOR TIRE CHAINS.

Application filed November 4, 1922. Serial No. 598,970.

*To all whom it may concern:*

Be it known that I, ALICE F. TOFFEY, a citizen of the United States, residing at Jersey City, county of Hudson, and State of New Jersey, have invented a certain new and useful Pull-Out Device for Tire Chains, of which the following is a specification.

This invention is an automobile accessory and, more specifically, an attachment adapted to be employed in conjunction with any of the well known conventional forms of anti-skid chains.

It has become the practice, when driving over roads or pavements which are wet, muddy or otherwise slippery, to associate chains with the tire of the automobile in order to obtain more positive traction and preclude slipping or skidding. Of these chains, probably the best known is the "Weed" chain which embodies a plurality of short chain lengths which extend over the tread of the tire and are held in place by longer lengths of chain bound circumferentially of the tire and at either lateral face thereof adjacent the rim. These chains are applied to the tires when running over slippery pavements or roads and usually form a part of the car equipment. They give satisfactory results under ordinary conditions, but are found to be of little value on ice, deep snow, deep mud and under other abnormal conditions and I have found, through experience, that additional means, capable of giving more positive and sure traction, is required.

With the foregoing considerations in mind, the present invention contemplates the employment of the conventional "Weed" chains under ordinary circumstances but provides an attachment which can be readily and expeditionsly associated with such chains when occasion demands, to augment them in the carrying out of their function. To this end, the attachment of this invention comprises one or more devices shaped to conform to the transverse contour of a tire and provided with outwardly projecting spurs or gripping members adapted to grip into ice, snow or the like and with each of such members is associated means for radially attaching or detaching the opposite ends thereof to the binding chains of the conventional chain structure so that in case of necessity one or more of such attachments may be readily and expeditiously associated with the tire for temporary use and until the temporary exigency is passed, whereupon they may be readily removed from the chains and carried in the tool box of the car until their employment is again necessary.

An important feature of the present attachment resides in the fact that the attachment is adapted to be associated with the conventional chains and without other form of attachment either to the tire or associated wheel. The advantage of this construction is that there will be more or less give when the force of the motor is imposed on the wheels so as not to produce excessive shocks or strains which would result if such members were rigidly attached to the wheel.

In its preferred practical form, each of said members embodies a yoke shaped to rest transversely of the shoe of the tire and provided at its opposite ends with spring clips adapted to be engaged with the chains for the purpose of detachably mounting the yokes in cooperative relation with the tire, and these yokes, which are of sufficient width to preclude cutting of the tire, are provided on their tread surfaces with projecting spurs, spikes or other protuberances which will insure the obtaining of the desired traction. Such a device is simple in construction, may be economically manufactured, and is unusually reliable and efficient in the carrying out of its intended purposes.

Features of the invention, other than those adverted to, will be apparent from the hereinafter detailed description and claims, when read in conjunction with the accompanying drawings.

The accompanying drawings illustrate one practical embodiment of the invention, but the construction therein shown is to be understood as illustrative, only, and not as describing the limits of the invention.

In the accompanying drawings, 1 designates a conventional tire shoe with which is associated the well known form of "Weed"

chain. These chains, as well known, embody two tire chains 2 which are bound circumferentially of the tire adjacent the rim and are connected by and serve to hold in place transverse chains 3 which extend over the tread surface of the shoe. In practice, the chains 2 and 3 are constructed from lengths interlocked with one another.

Figure 1:
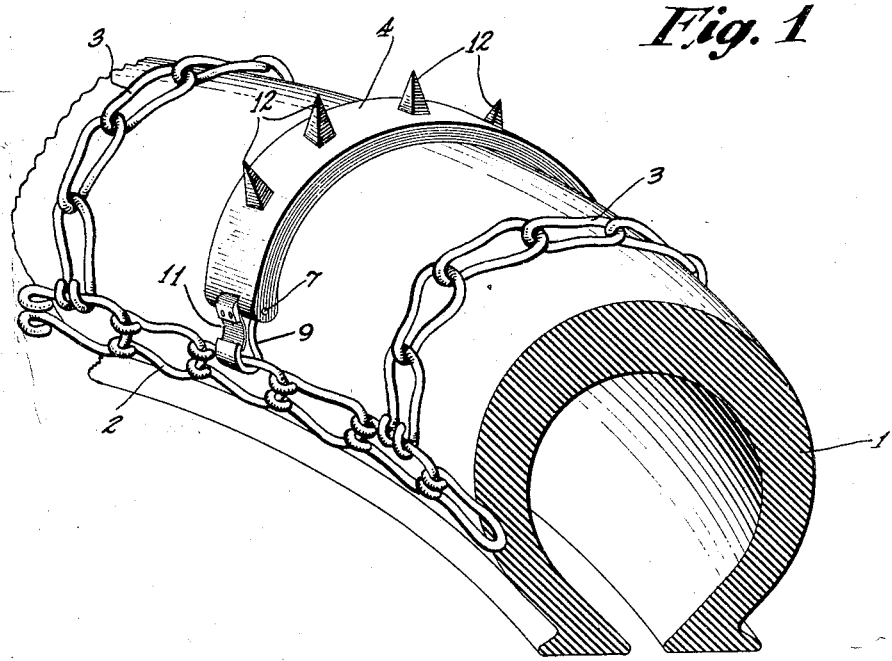
Figure 1 is a section perspective showing a tire with the conventional chains associated therewith and a pull-out of the present invention operatively connected to the chains.
Figure 2:
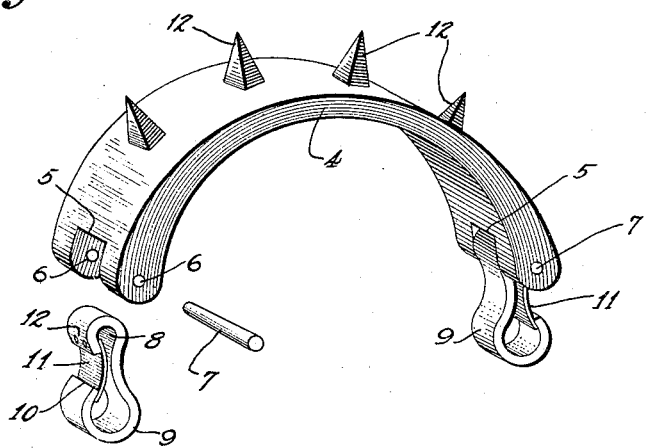
Figure 2 shows the device of the present invention in perspective and with one of the spring clips removed to better show its construction and mode of attachment.

The present invention, as shown best in Figure 2, comprises a metallic yoke 4 of substantially arcuate shape, appropriate to conform to the cross-sectional contour of the shoe so that such yoke may embrace the tread surface of the shoe after the manner shown in Figure 1. The opposite ends of the yoke are bifurcated, as shown at 5, and the legs of such bifurcations are perforated at 6 to receive the pin 7 which is adapted to be passed through such perforations and through the attaching end 8 of a spring clip 9, one of which is associated with each end of the yoke. The entry mouth 10 of each spring clip is adapted to be normally closed by a leaf spring 11 held in position by rivets 12, and two such spring clips are permanently associated with the end of each yoke. The form of clip described is simple and efficient and is the form preferred although, in practice, other forms of spring clip may be employed.

The parts are so proportioned that when the yoke is brought into a position to overlie the tread surface of the shoe the two clips 9 may be snapped into engagement with the two retaining chains 2 on opposite sides of the tire for the purpose of demountably securing each yoke in cooperative relation with the tire. Only one yoke is shown in the drawings, but it will be understood that any suitable number of them may be associated with each tire. The outer or tread surface of each yoke is provided with suitable projections to afford ample traction and while these projections may be of various shapes and sizes they are illustrated in the form of a plurality of metallic spurs 12 permanently secured to the yoke and suitably spaced with respect to one another. They should, in practice, be of such size and shape as to adequately cope with the conditions to which they are to be subjected so that they can be fully depended upon to obtain an adequate grip of the road and insure movement of the vehicle when they are applied for this purpose.

Experience has shown that when a plurality of my devices are associated with ordinary "Weed" chains they will augment the chains to such extent that a car so equipped will be able to safely and positively travel under conditions where the chains alone are insufficient to produce adequate traction. The devices are such that they may be readily and easily attached and detached and are of such relatively small size that they may be readily stored, when not in use, in the tool box of the car.

An important feature of the construction is that these devices are secured to the conventional chains and do not need their own separate chains as a means of attachment. Moreover, they are associated with the car in such a way that they will in no wise scratch or mar the wheels and in this respect are a marked advance over certain pull-out devices of which I am aware and which depend for their support upon chains or clamps passing around the felly of the wheel or attached to the spokes.

The foregoing description sets forth the preferred embodiment of the invention in detail, but the invention is to be understood as broadly novel as is commensurate with the appended claim.

Having thus fully described the invention, what I claim as new and desire to secure by Letters Patent is:

The combination with conventional non-skid tire chains of a pull-out device embodying a solid metallic strip of arcuate shape bifurcated at its opposite ends and adapted to embrace the tread surface of a tire and extend transversely thereof, metallic gripping projections extending from the medial portion of the tread surface of the metallic strip and rigid therewith, a clasp extending into the bifurcation at each end of the strip, and a pin passed through each bifurcated end and through the interfitted clasp associated therewith to pivotally mount a clasp at each end of the strip with the clasps in position to detachably engage with the circumferentially extending chain elements of the conventional non-skid chains for the purpose of demountably supporting the strip in cooperative relation with the chains and tire.

In testimony whereof I have signed the foregoing specification.

ALICE F. TOFFEY.